Oct. 5, 1965 W. F. LIST 3,210,740
HIGH RELIABILITY SAMPLING APPARATUS
Filed Feb. 15, 1960 2 Sheets-Sheet 1
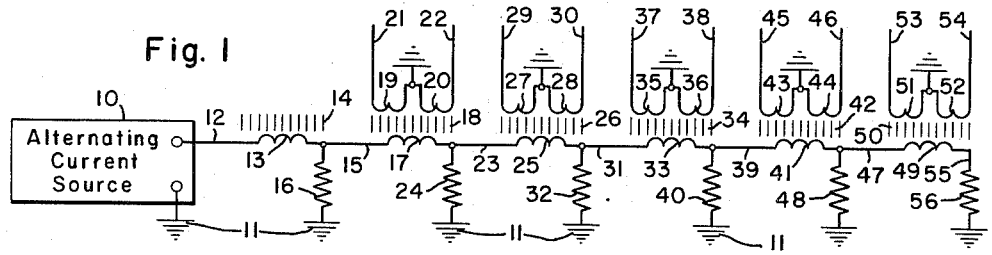
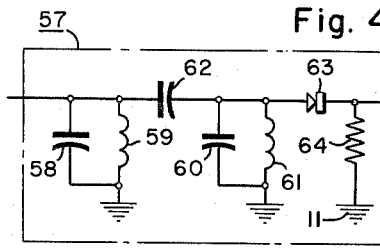
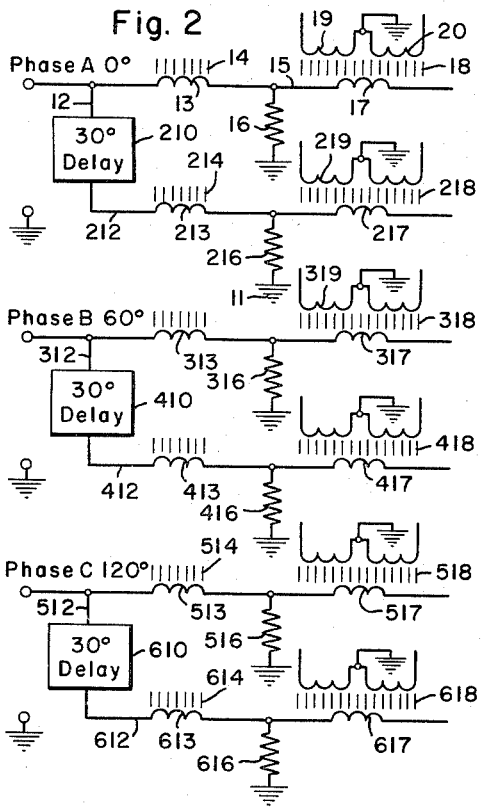
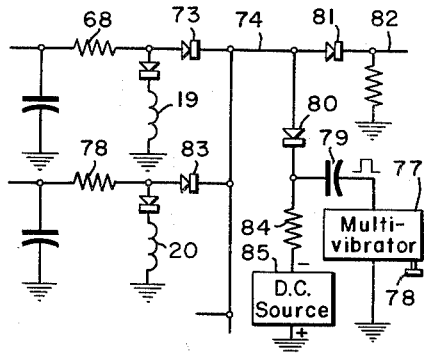

United States Patent Office 3,210,740
Patented Oct. 5, 1965

3,210,740
HIGH RELIABILITY SAMPLING APPARATUS
William F. List, Linthicum Heights, Md., assignor to Westinghouse Electric Corporation, East Pittsburgh, Pa., a corporation of Pennsylvania
Filed Feb. 15, 1960, Ser. No. 8,650
13 Claims. (Cl. 340—174)

This invention relates to improvements in sampling apparatus, and more particularly to an improved sampling circuit especially suitable for use in pulse Doppler radar filter bank sampling.

In pulse Doppler radar it is desirable to be able to sample a large number of input channels at a high speed for such applications as the examination of the outputs of velocity search filter banks employed in the Doppler radar system. Dopper radars usually obtain signal-to-noise discrimination by separating the wide frequency band of possible target signals into a large number of small sectors and examining the output of a detector connected to a narrow band filter covering each sector. For a typical case, a bank of sixty filters must be examined at least once per antenna dwell time, and preferably more often. With typical antenna search velocities, a sampling rate of at least sixty cycles per second is required. Under the present state of the art, if a wider velocity range must be covered, or finer velocity discrimination is desired, more filters must be employed, and either a slower antenna search of a faster sampling device is required.

Two general types of sampling devices are in present use. The first type device consists of a high speed mechanical switch, and although this type is relatively reliable when operated at low speeds, its useful life becomes unacceptably short at high operating speeds. A long-life mechanical switch suitable for use at speeds up to 60 revolutions per second exists in the form of a mercury jet device, but although this switch is suitable for laboratory use, it cannot be employed in high performance aircraft because of technical difficulties.

A second general group of sampling devices employs an electronic method of sampling. One prior art electronic sampling device employs a radial beam tube to obtain necessary switching pulses, but this tube is unfortunately subject to stray fields and in most cases requires a large number of impedance shifting cathode follower amplifiers. Another prior art electronic method employs magnetic matrix systems which require considerable excitation power and are therefore generally undesirable.

In summary, the apparatus of the instant invention overcomes these and other disadvantages of the prior art by employing a group of saturable core transformers to provide low impedance switching pulses to a diode switch unit, without the use of any moving parts and without the use of vacuum tubes or transistors. The apparatus may be operated with any desired number of channels and at speeds of at least 400 c.p.s. The apparatus is capable of passing the strictest environmental specifications and has a life well in excess of 1000 hours. In addition, its cost is comparative to other sampling techniques in present use; its size and weight are also additional advantages.

Accordingly, a primary object of the instant invention is to provide new and improved sampling apparatus.

Another object is to provide new and improved sampling apparatus especially suitable for use with pulse Doppler radar filter banks.

A further object is to provide a new and improved high reliability sampling circuit having no moving parts, and requiring no vacuum tubes or transistors.

These and other objects will become more clearly apparent from a study of the following specifications when read in connection with the accompanying drawings, in which:

FIG. 1 is a pulse forming network according to the preferred embodiment of the invention and is a portion of the entire circuit of the invention;

FIG. 2 is a schematic electrical circuit diagram showing that portion of the entire circuit arrangement for interconnecting a plurality of the pulse forming networks of FIG. 1 to obtain a total of sixty pulses in sequential order;

FIG. 4 is a schematic electrical circuit diagram of the portion of the circuit arrangement of the invention in which the pulses generated in the saturable core transformers of FIGS. 1 and 3 are used to sample filter banks; and FIG. 5 is a schematic electrical circuit diagram of a disabling switch for use with the apparatus of FIG. 4, according to a second embodiment of the invention.

Figure 3:
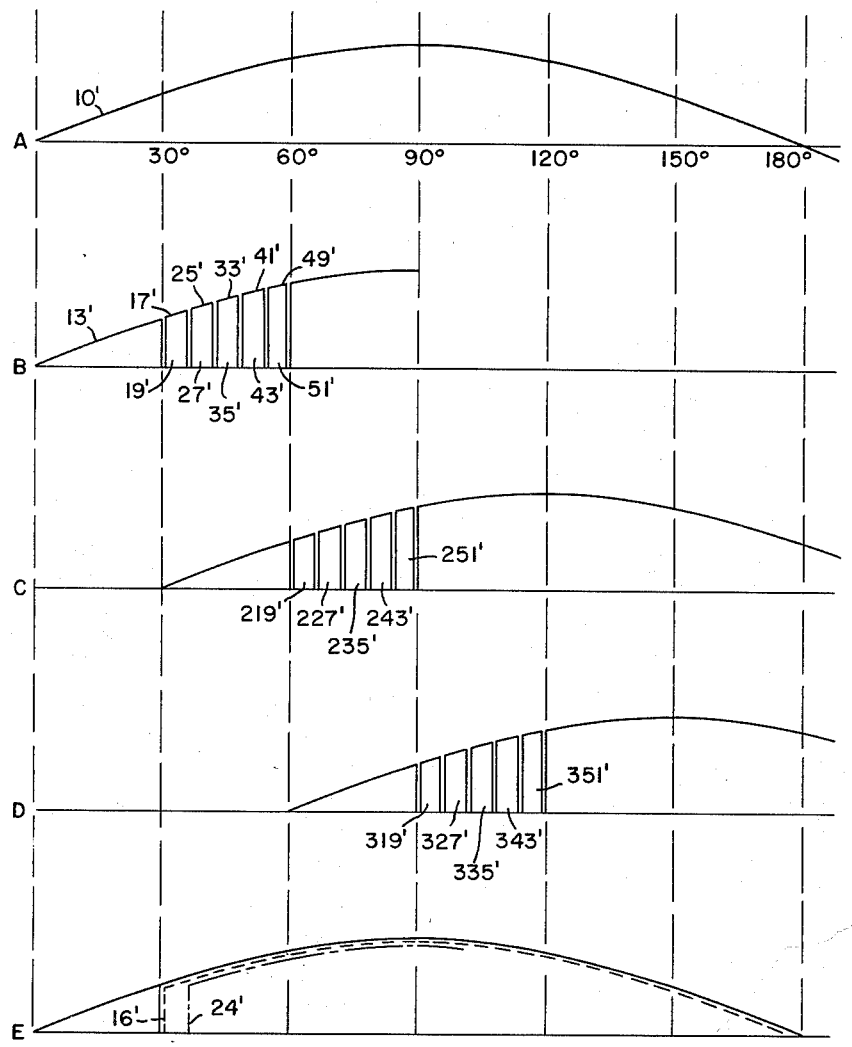
FIG. 3 is a series of graphs illustrating the waveforms of signals in the circuits of FIGS. 1 and 2.

Referring now to the drawings for a more detailed understanding of the invention, and particularly to FIG. 1 thereof, there is shown at 10 a source of alternating current potential of preferably sinusoidal waveform which may have a frequency of 400 c.p.s. The output of the source 10 is applied between ground 11 by way of output lead 12 to one terminal of the winding 13 of a saturable inductor having a saturable magnetic core 14. The other terminal of winding 13 is connected by way of lead 15 and resistor 16 to ground 11. Lead 15 is further connected to one lead or terminal of the primary 17 of a saturable transformer having a saturable core 18 and a center-tapped secondary with windings 19 and 20, the junction between windings 19 and 20 being connected to ground 11, windings 19 and 20 delivering their outputs across leads 21 and 22 respectively. The other terminal of primary 17 is connected by way of lead 23 and resistor 24 to ground 11. Lead 23 is connected to one terminal of the primary 25 of an additional saturable transformer having a saturable core 26 and center-tapped secondary windings 27 and 28 delivering their outputs on leads 29 and 30 respectively. The other terminal of primary 25 is connected by way of lead 31 and resistor 32 to ground 11. Lead 31 is connected to one terminal of the primary 33 of still an additional saturable transformer having saturable core 34 and secondaries 35 and 36 connected to leads 37 and 38 respectively. The other terminal of primary 33 is connected by way of lead 39 and resistor 40 to ground 11. Lead 39 is connected to one terminal of the primary 41 of another saturable transformer having saturable core 42 and secondaries 43 and 44 connected to leads 45 and 46 respectively. The other terminal of primary 41 is connected by way of lead 47 and resistor 48 to ground 11. Lead 47 is connected to one terminal of the primary 49 of still another saturable core transformer having saturable core 50 and secondaries 51 and 52 with connecting leads 53 and 54 respectively. The other terminal of primary 49 is connected by way of lead 55 and resistor 56 to ground 11.

Reference may be had now to the graphs of FIG. 3 to facilitate an understanding of the operation of the circuit of FIG. 1. The curve of graph A illustrates the waveform of the voltage on lead 12 and is preferably sinusoidal as aforementioned. As the voltage of the applied sine wave increases from zero, the voltage builds up across the saturable reactor winding 13 because of the relative values of the reactor impedance and the series resistor 16, and is shown by voltage 13' of curve B. The resistance of resistor 16 is made small compared to the impedance of the parallel circuit made up by the unsaturated reactor or transformer windings 17, 25, 33, 41 and 49 and associated resistors 24, 32, 40, 48 and 56. When the core 14 associated with winding 13 saturates, its impedance rapidly changes to a value small in comparison with the resistance of resistor 16 and hence the voltage as shown at 16' in curve E of FIG. 3 appears across resistor 16 and also across the attached parallel circuit. This voltage causes a magnetic field to be built up in the first saturable transformer including primary 17, core 18 and secondaries 19 and 20, which core 18 after a period of time determined by the core material, the applied voltage and the number of turns also saturates causing a voltage to appear across resistor 24, shown as 24' in curve E. The voltage across resistor 24 is applied to primary 25, and the process continues until all five cores have saturated in sequential order. The wave shape of the voltage across primary 17 is shown in curve B of FIG. 3 and is designated 17', and similar voltages 25', 33', 41' and 49' occur across the windings of primaries 25, 33, 41 and 49 respectively. It will be noted that the pulses 19', 27' 35', 43' and 51' are generated sequentially and that these pulses, which are shown in a positive direction, are generated in accordance with selective winding of the secondaries and occur across leads 21, 29, 37, 45 and 53 respectively. It should also be noted that each of the five saturable core transformers generates in the other half of the center-tapped secondary simultaneously with the generation of the positive pulse a negative pulse, and that these negative pulses are applied to output leads 22, 30, 38, 46 and 54 respectively, being pulses generated in secondaries 20, 28, 36, 44 and 52 respectively. Because of the diode switching circuit arrangement hereinafter to be described in detail, these negative pulses are rendered ineffective to cause sampling of the particular filter sections to which they are applied. It should also be noted that whereas these aforedescribed polarities occur during the positive alternation of the signal on lead 12, the positive alternation being shown in curve A of FIG. 3, that on the next or negative alternation of the voltage from source 10 applied to lead 12 the polarities of the pulses produced in secondaries 20, 28, 36, 44 and 52 are reversed and become positive, whereas the pulses produced in secondaries 19, 27, 35, 43 and 51 are reversed in polarity and become negative.

As previously stated, a typical number of sequential pulses to be produced in any time period is 60, and the circuit to be described provides for the generation of sixty positive pulses during one complete cycle of the voltage from source 10. Sixty unused negative pulses are also generated during each cycle. To obtain a second series of five pulses such, for example as that shown in curve C of FIG. 3, the potential on lead 12 is delayed by thirty degrees by any convenient means, such for example as the delay circuit 210, FIG. 2, and applied by way of lead 212, FIG. 2, to one terminal of a saturable reactor having winding 213 which may be similar to winding 13, the other terminal of winding 213 being connected by way of resistor 216 to ground 11. There is shown at 217 the primary winding of the first of five additional saturable transformers which correspond to the five saturable transformers shown in FIG. 1. The five output pulses including the pulse from secondary 219 are as previously stated shown in curve C of FIG. 3, and are designated 219', 227', 235', 243' and 251'. A third series of pulses such for example as those shown in curve D of FIG. 3 is provided by utilizing a voltage of the same frequency delayed sixty degrees in phase from the voltage on lead 12 and applied by a lead 312 to the winding 313 of a saturable core inductor having associated therewith the resistor 316 and the primary 317 of the first of five other saturable transformers which may be similar to the five saturable transformers shown in FIG. 1. Pulse 319' represents the pulse from secondary 319, while pulses 327', 335', 343' and 351' represent pulses from four other sequentially saturated transformers, not shown. The voltage on lead 312 may also delayed by 30 degrees by delay means 410 and applied by way of lead 412 to a fourth saturable core device having winding 413 which, when the core saturates, develops a voltage across resistor 416 which is applied to the primary 417 of the first of five additional saturable transformers similar to the five saturable transformers of FIG. 1. Two additional saturable cores are shown in FIG. 3, one being designated 513 and connected by lead 512 to phase C which it is understood is a voltage which is delayed 120 degrees from the voltage on lead 12. Core 513 has resistor 516 associated therewith and the voltage developed across resistor 516 when the core 514 saturates is applied to the primary winding 517 of the first of five additional saturable core transformers. The voltage on lead 512 is delayed 30 degrees at delay means 610 and applied by lead 612 to an additional saturable core reactor having winding 613. When the core 614 associated with winding 613 saturates, a voltage is developed across resistor 616 which is applied to the primary winding 617 of the first of five additional saturable core transformers similar to the five transformers of FIG. 1. There has been provided then a total of 30 sequentially saturated transformers for generating positive pulses in the left-hand secondary windings of the 30 saturable transformers, it being assumed that all of the transformers are similarly wound. During the next or negative alternation of the voltage from the source 10, the other halves of each of the secondaries of the saturable core transformers generate positive pulses so that in all, 60 positive pulses are sequentially generated for each complete cycle of the wave form of the voltage from the source 10, which as previously stated may be 400 c.p.s.

Particular reference should be made now to FIG. 4. There is shown enclosed in dashed lines and generally designated 57 a typical pulse Doppler search filter where information is stored, and it will be understood that any suitable filter unit could be employed. The particular filter unit shown is seen to comprise two parallel circuits, the first including capacitor 58 and inductor 59 connected in parallel with each other, and the second including capacitor 60 and inductor 61 connected in parallel with each other, the two circuits being joined by capacitor 62. One side of capacitor 62 is connected by way of rectifier 63 and resistor 64 to ground 11. The junction between rectifier 63 and resistor 64 is connected by decoupling resistor 65, lead 66, resistor 68, lead 69, rectifier 70, resistor 71, and secondary 19 to ground 11. Lead 66 has capacitor 67 connected therefrom to ground 11. The aforementioned lead 69 is also connected by way of rectifier 72 to ground 11, it being noted that the positive terminal of rectifier 70 is connected to lead 69 whereas the negative terminal of rectifier 72 is connected to lead 69. Lead 69 is also connected by way of rectifier 73 to an output lead 74 which is connected by way of resistor 75 and a small source of direct current potential 76, which may be omitted if desired, to ground 11. It should be noted that the positive pole of rectifier 73 is connected to lead 69. The signal on lead 74 is applied to utilization means 90. It should be noted further that the positive terminal of source 76 is connected to resistor 75 and thence to lead 74.

It should be understood that sixty separate diode switching channels are provided similarly to the one aforedescribed for each of the sixty filters in the filter bank, and that all of the channel outputs thereof are connected to the output lead 74.

A switching pulse is introduced into this particular channel from the secondary 19 of the aforedescribed saturable core transformer having core 18 and primary winding 17 as shown in FIG. 1. It will be noted that because of the polarity of rectifier 63, the signal output of storage element 57 is of a positive polarity. During the period, which it will be understood includes substantially $59/60$ of the total time, when no positive output pulse is introduced into this particular channel from secondary 19, the input signal or voltage to the channel appearing on lead 66 is applied through resistor 68, lead 69, the diode 70, the resistor 71 and lead 21 to the secondary 19. A signal current may flow. The positive voltage at the junction of rectifiers 70 and 73 which appears on lead 69 is less than the voltage on lead 74, since this lead 74 is maintained at a more positive polarity by the flow of current from the switch channel in which a positive pulse is instantaneously present. An alternative method of preventing the voltage on lead 69 from flowing to lead 74 until a positive pulse appears on lead 69 is by use of a preselected positive voltage supplied by source 76. This alternative method is employed when for convenience the switch pulses to the various channels are separated from each other in time for some special sampling function. Under these conditions the rectifier 73 is back-biased or reverse-biased so that it does not conduct until a positive voltage appears on lead 69 which exceed the potential on lead 74. Accordingly, while these conditions exist, the rectifier 73 prevents a signal from this input lead 66 reaching the output terminal lead 74. When a positive voltage pulse appears across the secondary 19, however, the diode 70 is blocked or back-biased, and the signal or voltage on lead 69 rises or increases to substantially the full value across the input circuit or more specifically to the output of the filter section. The voltage on the junction lead 74 becomes lower than the voltage at the junction of rectifiers 70 and 73, which is the voltage on lead 69, and hence the rectifier 73 conducts at least the upper portion of the signal on lead 69 to the output lead 74. Since no other channel is now blocked, lead 74 is in effect connected to the input of the channel under consideration and to no other channel for a brief period of time. The voltage in storage device 57 is "sampled" for this brief period. After the pulse from secondary 19 has disappeared, lead 74 is effectively disconnected from lead 69, since the potential on lead 69 falls to a value less than the potential on lead 74.

As previously stated, a negative pulse is generated in secondary 20 at the same time that a positive pulse is generated in secondary 19. There is shown in the lower section of the diode switching circuit of FIG. 4 a lead 77 which it is understood is connected to an additional filter section or signal storage element, not shown, the voltage on lead 77 being applied by way of resistor 78, lead 79, rectifier 80, resistor 81 and lead 22 to the aforementioned secondary 20. A rectifier 82 connects lead 79 to ground 11 and a further rectifier 83 connects lead 79 to the output lead 74. Rectifiers 80, 82 and 83 are poled in the same directions as the aforedescribed rectifiers 70, 72 and 73 respectively. A negative pulse occurring in secondary 20, which is greater in amplitude than the signal on lead 79, causes rectifier 80 to conduct to ground by way of lead 79 and rectifier 82, which are poled in the correct direction to pass a negative pulse generated in secondary 20 to ground, so that lead 79 is not raised in a positive direction above the steady potential on lead 74, and rectifier 83 does not conduct during the negative pulse in secondary 20 and does not operatively connect lead 79 to output lead 74.

It will be understood that during the next alternation of the supply voltage from source 10, the pulses in secondaries 19 and 20 are reversed in polarity, so that lead 79 is connected to output lead 74 whereas lead 69 remains disconnected therefrom.

There has been provided then an arrangement in which sixty filter sections or signal storage elements are sequentially connected to an output lead 74 to provide a sampling arrangement meeting the aforedescribed objects of the invention.

Particular reference should now be made to FIG. 5. In the event it is desirable to commutate each filter bank or other signal source at a rate less than once per cycle of the source 10, as might occur when it was desired to sample two or more filter banks sequentially, or when for reasons particular to a certain radar it might be desirable to disable output pulses from a certain group of filters (as for example when such filters might contain jamming interference), the circuit of FIG. 5 provides such operation. The circuit is connected as previously described except that an additional circuit consisting of a suitable pulse generator such as a multivibrator 97 controlled by a suitable means 98, is used to generate gate pulses which are coupled by a capacitor 99 to the junction of a resistor 94, returned to a negative voltage source 95, and a diode 100 which is connected to the junction of lead 74 and diode 91 which normally connects the output from the commutating switch to the output lead 92. When no positive pulse is coupled through capacitor 99, the potential on lead 74 causes a current to flow thorugh diode 100 and resistor 94 thus lowering the potential of the lead 74 to a value lower than the lead 92 and hence causing diode 91 to be rendered non-conducting, and thus preventing signals from being coupled to the output lead 92. When a positive pulse is coupled to the junction of diode 100 and resistor 94, the potential of this junction is raised above the potential of lead 74 causing diode 100 to become blocked, thus raising the potential of lead 74 and permitting the potential of lead 74 to be connected to the output 92.

It will be apparent that if the direct current source 95 was made positive rather than negative, and the multivibrator pulse made negative rather than positive, circuit performance would remain the same, except that the switch would be normally conductive and would be gated off by the application of the negative pulse. The selection of which polarity pulse and source to employ is determined by the circumstances of a particular application.

As an alternative arrangement for providing that transformers with cores 18 and 218, 318 and 418, and 518 and 618 saturate a predetermined number of degrees apart of the potential from source 10, instead of the delay circuits 210, 410, and 610, the windings of the various saturable core devices and the values of the resistors could be designed so that higher voltages are required to saturate cores 214 and 218 than cores 14 and 18 respectively, etc., so that the second (lower) branch of the circuit operates to generate its first pulse only when the voltage waveform 10' has risen to a higher level or higher position on the slope, and the preceding group of saturable devices has completed its last pulse.

In some applications, the effect of the negative pulse on the signal circuit will be negligible and resistor 71 and diode 72 can be omitted with a resulting simplification of the circuit.

Whereas the invention has been shown and described with respect to several embodiments thereof which give satisfactory results, it should be understood that changes may be made and equivalents substituted without departing from the spirit and scope of the invention.

I claim as my invention:

1. In sampling apparatus, in combination, a source of alternating current potential, a saturable core transformer having a secondary, circuit means connecting said saturable core transformer to said source of alternating current potential whereby a pulse of predetermined polarity is generated in said secondary, signal storage means for a signal to be sampled, a first rectifier, first lead means connecting one terminal of said first rectifier to said signal storage means, second lead means connecting the other terminal of said first rectifier to said secondary, said first rectifier being poled to normally pass a signal on said first lead means in an electrical path through said secondary parallel to said output lead, said pulse of predetermined polarity in said secondary applying a reverse bias to said first rectifier, a second rectifier, and output lead means connected to one terminal of said second rectifier, the other terminal of said second rectifier being connected to said first lead means, said second rectifier being poled in a direction to normally pass to the output lead means the signal on said first lead means, the signal flow through said secondary while no pulse is generated therein effectively reverse biasing said second rectifier and thus effectively disconnecting said first lead means from said output lead, said pulse applying a reverse bias to said first rectifier thereby causing the signal on said first lead means to increase to a value sufficient to pass through the second rectifier and be applied to said output lead means.

2. Sampling apparatus comprising, in combination, a source of alternating current potential, a saturable core inductor, first and second saturable core transformer means having first and second secondaries respectively, series and parallel circuit means interconnecting the first and second saturable core transformer means, the saturable core inductor, and said source of alternating current potential for causing the cores of the first and second saturable core transformer means to saturate and provide pulses in said first and second secondaries, in chronological sequence, first and second signal storage means for signals to be sampled, first circuit means including a first rectifier connecting the first signal storage means to the first secondary, second circuit means including a second rectifier connecting the second signal storage means to the second secondary, output circuit means, and third and fourth rectifiers connecting said first and second circuit means respectively to the output circuit means, the occurrence of pulses in said first and second secondaries applying reverse biases to said first and second rectifiers respectively causing said third and fourth rectifiers respectively to pass the signals from the first and second signal storage means to the output circuit means.

3. Sampling apparatus comprising, in combination, a source of alternating current potential, first saturable core transformer means having a first primary and a first secondary, second saturable core transformer means having a second primary and a second secondary, a saturable inductor, circuit means connecting the saturable inductor, the first primary and the second primary in series to said source of alternating current potential, the cores of the first and second saturable core transformer means saturating sequentially during one alternation of the potential from said source and providing sequential pulses in the first and second secondaries, first and second signal storage means for signals to be sampled, other circuit means including a first rectifier connecting the first signal storage means to said first secondary, additional circuit means including a second rectifier connecting the second signal storage means to the second secondary, output lead means, means connected to the output lead means for maintaining the output lead means at a predetermined polarity and potential, and a further pair of rectifiers connecting the first rectifier and second rectifier respectively to said output lead means, all of said rectifiers being poled in predetermined directions whereby in the absence of pulses in said first and second secondaries said pair of additional rectifiers are reverse-biased and effectively disconnect the first and second signal storage means from the output lead means, a pulse of predetermined polarity occurring in the first secondary causing the signal in the first signal storage means to pass to the output lead means, a pulse of said predetermined polarity in the second secondary causing the signal in the second signal storage means to pass to said output lead means.

4. Apparatus according to claim 3 wherein said first and second secondaries are additionally characterized as having pulses of the opposite polarity produced therein during the other alternation of said source of alternating current potential, and including an additional pair of rectifiers connected to said first and second rectifiers respectively, said additional pair of rectifiers by-passing said pulses of opposite polarity and rendering said first and second signal storage means unaffected by said pulses of opposite polarity.

5. Sampling apparatus comprising, in combination pulse generating means including a saturable core transformer having first and second secondaries, a source of alternating current potential connected to said pulse generating means, the core of said saturable transformer saturating at predetermined times during the alternations of the alternating current potential and causing the generation of pulses of opposite polarity in said secondaries, first and second signal storage means for the signals to be sampled, output lead means, and first and second diode switching circuit means, said first diode switching circuit means being connected to said first secondary, said second diode switching circuit means being connected to said second secondary, said first diode switching circuit means being connected to said first signal storage means and to said output lead means and utilizing pulses of one polarity in said first secondary to pass the signal output from the first signal storage means to the output lead means, said first diode switching circuit means including means for by-passing pulses of the other polarity in said first secondary, said second diode switching circuit means connecting said second signal storage means to said output lead means, said second diode switching circuit means utilizing pulses of one polarity in said second secondary to pass the signal from the second signal storage means to the output lead means, said second diode switching circuit means including means for by-passing pulses of the other polarity in said second secondary.

6. Sampling apparatus comprising, in combination, first and second saturable core transformers having first and second primary windings respectively, a source of alternating current potential, saturable core inductor means connected to one terminal of said source, first resistor means connected to the other terminal of said source, pulse circuit means connecting said first resistor means, said second and first primary windings and said saturable core inductor means all in series in the order named across said source of alternating current potential, second resistor means connecting the junction between the first and second primary windings to said other terminal of said source, third resistor means connecting the junction between the first primary winding and the saturable core inductor means to the other terminal of the source of alternating current potential, the saturable core inductor means saturating at a predetermined instant in the rise of voltage from said alternating current source and applying an increased potential to the first primary winding of the first saturable core transformer, the core of the first saturable transformer thereafter saturating after a predetermined time interval and applying an increased potential of predetermined amplitude to the second primary of the second saturable core transformer, the core of the second saturable transformer saturating after a predetermined time interval, the first and second saturable core transformers having first and second secondary windings respectively, the first and second secondaries having pulses of predetermined polarity sequentially produced therein, output lead means, first circuit means including a first pair of series connected oppositely poled rectifiers connecting the first secondary to the output lead means, means connected to the junction between said first pair of oppositely poled rectifiers for applying the signal output of a first storage element to be sampled to said junction, second circuit means including a second pair of oppositely poled series-connected rectifiers connecting the second secondary to said output lead means, and other means connected to the junction between said second pair of oppositely poled rectifiers for applying the signal output of a second storage element to be sampled to said last named junction, pulses of predetermined polarity in the first secondary back-biasing one of the rectifiers of said first named pair of oppositely poled rectifiers and causing the other rectifier of the pair to pass to the output lead means the signal output of the first storage element, pulses in the second secondary back-biasing one of the rectifiers of said second pair and causing the other rectifier of the second pair to pass to the output lead means the signal output of the second storage element.

7. Sampling apparatus comprising, in combination, first saturable transformer means including a first primary, a first saturable core and a first secondary; second saturable transformer means including a second primary, a second saturable core and a second secondary; saturable inductor means; a source of alternating current potential of predetermined frequency; pulsing circuit means connecting said source of alternating current potential, said saturable inductor means, said first primary and said second primary in series whereby the first saturable core saturates at a predetermined point in the voltage rise of one alternation of the alternating current source and the second saturable core thereafter saturates a predetermined time interval later during the further rise of voltage during said alternation, the saturation of the first core and the saturation of the second core producing sequential pulses in said first and second secondaries; output lead means; means for biasing said output lead means at a predetermined direct current potential of predetermined polarity; first signal storage means; second signal storage means; first circuit means including a first rectifier and a first resistor connecting the first signal storage means to the first secondary; second circuit means including a second rectifier and a second resistor connecting the second signal storage means to the second secondary; and first and second coupling rectifiers connecting the first circuit means and the second circuit means respectively to said output lead means, the stored signals applied to the first and second circuit means providing for signal flow through the first and second resistors, the first and second rectifiers and the first and second secondaries respectively while no pulses are produced in said first and second secondaries, the signal flows in the first and second circuit means providing that the potentials in the first and second circuit means are lower than the biasing potential on the output lead means, said biasing potential normally back-biasing the first and second coupling rectifiers and preventing the passage of signals therethrough, pulses in the first and second secondaries sequentially back-biasing the first and second rectifiers respectively and causing the potentials in the first and second circuit means to rise to sufficient values whereby signals are sequentially passed by the first and second coupling rectifiers to the output lead means.

8. Sampling apparatus comprising, in combination, a source of alternating current potential, saturable transformer means operatively connected to the source of alternating current potential to be energized therefrom, said saturable transformer means including a first secondary and a second secondary, the saturable transformer means during an alternation of one polarity of the alternating current source producing in the first secondary a first positive pulse followed by a second positive pulse in the second secondary, said saturable transformer means during the alternation of opposite polarity of the alternating current source producing a first negative pulse in the first secondary followed by a second negative pulse in the second secondary, first and second signal storage means for storing first and second signals to be sampled, said first and second signals being of the same predetermined polarity, output lead means, means connected to the output lead means for biasing the output lead means at a predetermined potential and at a polarity corresponding to the polarity of the first and second signals, first switching circuit means including first, second and third rectifiers, each of said first, second, and third rectifiers having one terminal thereof connected to a first circuit junction point, means connecting the first storage means to the first circuit junction point whereby the first signal is applied to said first junction point, the first rectifier connecting the first junction point to the output lead means and being poled in a direction to pass the signal at the first junction point to the output lead means when the voltage at the first junction point exceeds the biasing potential on the output lead means, the second rectifier connecting said first junction point to a common circuit point and being poled in a direction whereby the first signal of the first storage means is not passed to the common circuit point, the first secondary and the third rectifier being connected in series between the first junction point and the common circuit point, the third rectifier being poled in a direction whereby the first signal from the first storage means at the first junction point normally flows through the third rectifier and the first secondary to the common circuit point in the absence of a pulse in said first secondary, second switching circuit means including fourth, fifth, and sixth rectifiers, each of the fourth, fifth, and sixth rectifiers having one terminal thereof connected together at a second junction point, and other means connecting the second signal storage means to the second junction point whereby the second signal is applied to the second junction point, the fourth rectifier connecting the second junction point to the output lead means and being of a polarity to pass the second signal at the second junction point to the output lead means when the second signal potential at the second junction point exceeds in amplitude the biasing potential on the output lead means, the fifth rectifier connecting the second junction point to said common circuit point and being poled in a direction to normally not pass the second signal from the second storage means to the common circuit point, the sixth rectifier and the second secondary being connected in series between the second junction point and said common circuit point whereby signals from the second storage means normally flow through the sixth rectifier and the second secondary to the common circuit point in the absence of a pulse in said second secondary, the first positive pulse in the first secondary back-biasing the third rectifier and causing the potential at the first junction point to rise to a value so that current flows from the first junction point through the first rectifier to the output lead means, the second positive pulse in the second secondary back-biasing the sixth rectifier and causing the potential at the second junction point to rise to a value whereby the second signal flows through the fourth rectifier to the output lead means, the first negative pulse in the first secondary passing through the third rectifier and the second rectifier to the common circuit point and causing no increase in potential at the first junction point, and the second negative pulse in the second secondary passing through the sixth rectifier and the fifth rectifier and causing no increase in potential at the second junction point.

9. Apparatus according to claim 8 including in addition multivibrator means operatively connected to the output lead means for disabling the first and second switching circuit means.

10. In sampling apparatus, in combination, a source of alternating current potential, means including saturable transformer means operatively connected to said source and having a secondary for producing a pair of sequential pulses of opposite polarity therein, signal storage means for storing signals to be sampled, output lead means, means connected to the output lead means for biasing the output lead means at a predetermined potential and polarity, switching circuit means including first, second and third rectifiers, each of the first, second and third rectifiers having one terminal thereof connected to a circuit junction point, means connecting the signal storage means to said circuit junction point, the first rectifier being connected between the circuit junction point and the output lead means and poled in a direction to pass the signal from the storage means to the output lead means when the signal at the circuit junction point exceeds in amplitude the biasing potential on the output lead means, said second rectifier being connected in series with said secondary between the circuit junction point and a common circuit point, the second rectifier in the absence of a pulse in the secondary being poled in a manner to cause storage signal current to flow from the circuit junction point through the secondary to the common circuit point, the third rectifier being connected from the circuit junction point to the common circuit point and poled in a manner to oppose the flow of storage signal current therethrough, a pulse of one polarity in said secondary back-biasing the second rectifier and causing the potential at the circuit junction point to rise to a value which exceeds the biasing potential on the output lead means so that signal current flows through the first rectifier from the storage means to the output lead means, a pulse of the opposite polarity in said secondary passing through the second and third rectifiers to the common circuit point, said last-named pulse causing no increase in the potential at the circuit junction point and causing no signal current to flow from the storage means to the output lead means.

11. In sampling appartus, in combination, a source of alternating current potential, means including saturable transformer means operatively connected to said source and having first and second secondaries for producing in said secondaries respectively first and second sequential pulses of the same predetermined polarity, first and second signal storage means for storing signals to be sampled, output lead means, means connected to the output lead means for biasing the output lead means at a predetermined polarity and potential, first switching circuit means connecting the first secondary and the first signal storage means to the output lead means, the first switching circuit means including first and second rectifiers, the first and second rectifiers each having the corresponding terminal thereof connected to a first circuit junction point, the signal output of the first signal storage means being applied to said first circuit junction point, the first rectifier being connected from the first circuit junction point to the output lead means and poled in a manner to pass a signal from the first storage means to the output lead means when the potential of the first circuit junction point exceeds the biasing potential on the output lead means, the second rectifier being connected in series with the first secondary between the first circuit junction point and a common circuit point, the second rectifier being poled in a manner to pass the first storage signal from the first circuit junction point through the first secondary to the common circuit point in the absence of a pulse in the first secondary, the first pulse of said predetermined polarity in the first secondary back-biasing the second rectifier and causing the potential at the first circuit junction point to rise to a value which exceeds the biasing potential on the output lead means whereby the signal from the first storage means is passed to the output lead means, second switching circuit means interconnecting the output lead means, the second signal storage means and the second secondary, the second signal storage means including third and fourth rectifiers, the third and fourth rectifiers each having the corresponding terminal thereof connected to a second circuit junction point, the output of the second storage means being applied to said second circuit junction point, the third rectifier connecting the second circuit junction point to the output lead means and being poled in a manner to pass a signal to the output lead means when the potential at the second circuit junction point exceeds the biasing potential on the output lead means, the fourth rectifier being connected in series with the second secondary between the second circuit junction point and said common circuit point, the fourth rectifier conducting signals from the second storage means through the second secondary in the absence of a pulse in the second secondary, the second pulse in the second secondary back-biasing the fourth rectifier and causing the potential at the second circuit junction point to rise to a value which exceeds the biasing potential on the output lead means whereby signals from the second storage means are passed to the output lead means.

12. Apparatus according to claim 10 including in addition multivibrator means operatively connected to the output lead means for disabling the switching circuit means.

13. Apparatus according to claim 11 including in addition multivibrator means operatively connected to the output lead means for disabling the first and second switching circuit means.

References Cited by the Examiner
UNITED STATES PATENTS

| 2,585,545 | 2/52 | Gannett | 307—88 |
| 2,758,221 | 8/56 | Williams | 307—88 |
| 2,861,202 | 11/58 | Brinster et al. | 307—88 |
| 2,872,666 | 2/59 | Greenhalgh | 340—347 |
| 2,898,480 | 8/59 | Loeffler | 307—88 |
| 2,957,165 | 10/60 | Newhouse | 307—88 |
| 2,995,732 | 8/61 | Mintezer | 307—88 |
| 3,041,582 | 6/62 | Cray | 307—88 X |

IRVING L. SRAGOW, *Primary Examiner.*